United States Patent [19]

Sparks et al.

[11] Patent Number: 4,570,745

[45] Date of Patent: Feb. 18, 1986

[54] METHOD AND APPARATUS FOR MINIMIZING PULSATIONS IN FLUID TRANSMISSION SYSTEMS

[75] Inventors: Cecil R. Sparks; Glenn Damewood, both of San Antonio, Tex.

[73] Assignee: Southern Gas Association, Dallas, Tex.

[21] Appl. No.: 585,844

[22] Filed: Mar. 2, 1984

[51] Int. Cl.⁴ ............................................. F01N 1/02
[52] U.S. Cl. ................... 181/228; 181/206; 181/230; 181/233; 181/269; 181/296; 138/26; 29/157 R
[58] Field of Search ......................... 181/206, 233–235, 181/261, 274, 207, 230, 269, 228, 296; 138/26; 29/157 R

[56] References Cited

U.S. PATENT DOCUMENTS

| | | | |
|---|---|---|---|
| 2,297,046 | 9/1942 | Bourne | 181/250 |
| 2,936,041 | 5/1960 | Sharp et al. | 181/206 |
| 2,997,124 | 8/1961 | Damewood et al. | 181/233 |
| 4,109,751 | 8/1978 | Kabele | 181/255 X |
| 4,225,011 | 9/1980 | Taguchi | 181/296 X |

Primary Examiner—Benjamin R. Fuller
Attorney, Agent, or Firm—Hubbard, Thurman, Turner & Tucker

[57] ABSTRACT

Acoustic pulsations in fluid transmission systems such as gas pipelines, engine exhaust systems and compressed air networks are suppressed by an acoustic filter comprising an enlarged pressure vessel with inlet and outlet conduits arranged such that conduit inlet and outlet openings are at the pressure node of standing pressure waves of the pressure vessel length resonant frequency and odd or even harmonics of the fundamental frequency. The inlet and outlet conduit openings are arranged such that the direction of convection flow and acoustic pulsation modulating flow is transverse to the instantaneous particle velocity of fluid resulting from acoustic pulsations existing in or excitable in the pressure vessel. Inlet and outlet conduits preferably open into the pressure vessel in a generally radial direction with respect to the central longitudinal axis of the vessel.

21 Claims, 7 Drawing Figures

METHOD AND APPARATUS FOR MINIMIZING PULSATIONS IN FLUID TRANSMISSION SYSTEMS

BACKGROUND OF THE INVENTION

1. Field of the Invention

The present invention pertains to a method and apparatus for minimizing the generation and transmission of acoustic vibrations in fluid transmission components such as piping systems and pressure vessels. The method and apparatus minimize the transmission and effect of fluid pressure pulsations at resonant frequencies of the transmission components and due to the velocity modulations of the fluid flow entering and leaving a component.

2. Background

The elimination of acoustic vibrations or pressure pulsations in fluid transmission systems and the adverse affects thereof has been a longstanding problem in the design of various types of fluid transmission equipment including compressed air networks, gas process and transmission systems, internal combustion engine exhaust systems, and other types of fluid processing and transmission apparatus. A widely accepted method of dampening the pressure pulsations generated by positive displacement air and gas compressors, pumps and other fluid handling devices and the muffling of internal combustion engine exhaust noise comprises the provision of a combination of conduits and somewhat enlarged pressure vessels interposed in the conduits to dampen or suppress acoustic pulsations and the mechanical vibrations induced by such pulsations in the conduit system.

In accordance with the teaching of U.S. Pat. Nos. 2,936,041 to J. M. Sharp, et al and 2,997,124 to G. Damewood, et al, it has been determined that so-called acoustic filters or pulsation suppressing devices can be designed for use in fluid transmission systems to have a cutoff frequency below the lowest fundamental frequency generated by a compressor, pump or other device and to dampen certain pressure waves of different frequencies. Moreover, the teachings of the Sharp, et al and Damewood, et al patents also are directed to suppressing the transmission of pressure pulsations and pulsation induced mechanical vibrations of acoustic filter network components by locating points of communication of the fluid inlet and outlet conduits with a pressure vessel at a point along the vessel length corresponding to a pressure node of the standing pressure wave of the frequency to be suppressed.

In particular, the prior art suggests the provision of an acoustic filter in which the transmission of resonant frequencies between the filter and piping elements is minimized through suitable locations of the flow junctures of the inlets and outlets of various enlarged pressure vessels also termed acoustical capacitances. The Sharp, et al and Damewood, et al patents suggest that the acoustic vibrations generated in an acoustic capacitance comprising a pressure vessel, frequently also termed a bottle, manifold or header, can be minimized by connecting the fluid flow inlet conduits to the vessel at the midpoint of the so-called acoustic length of the vessel so as to suppress pulsations of a frequency corresponding to the fundamental vessel length resonant frequency and odd harmonics of the length resonant frequency. Since standing pressure waves of even harmonic frequencies have pressure maxima occurring simultaneously at opposite closed ends of an elongated generally uniform diameter pressure vessel type acoustic capacitance and the wave pressure minima also occur simultaneously, if the areas at the ends of the vessel are equal the mechanical forces generated by the even harmonic standing waves at opposite ends of the vessel are balanced and mechanical vibrations do not occur. However, the odd harmonic standing waves have pressure maxima occurring at one end of the vessel while at the same time pressure minima occur at the other end. This, of course, causes unbalanced forces to develop which result in mechanical vibration. However, with the introduction of fluid to an acoustic filter or capacitance of the type described at a pressure node of the resonant frequency standing pressure wave, or standing pressure waves of odd harmonics of the resonant frequency, incoming pulsations of the same frequency will be effectively cancelled. Moreover, resonant vibrations in the vessel connot be excited by the in feeding of pressure pulsations at such a node.

If pressure pulsations already exist in a pressure vessel at one of its resonant frequencies then a conduit opening into the vessel located at a pressure node will not be subjected to pulsating flow at the frequency of the corresponding standing wave. It has been suggested that this is particularly true as long as the intersection of the pressure vessel with the conduit in question has no internal protrusions and as long as the diameter of the conduit is relatively small as compared with the wavelength of the resonant pulsations.

The Damewood, et al patent, also, suggests that the inlet flow conduits into an elongated pressure vessel type acoustic capacitance should extend substantially parallel to the longitudinal axis of the vessel and open into the vessel in a direction along its axis. On the other hand, the pulsation dampening devices described in the Sharp, et al patent suggest the provision of side branch inlet and outlet conduits with respect to a pressure vessel type acoustic capacitance and which conduits merely open into the sidewall of the vessel.

In many fluid transmission systems, pressure vessels and other enlarged volume chambers which are adapted to serve as acoustical capacitances or filter components may, for various reasons, have inlet and outlet conduits arranged according to the teachings of the Damewood, et al patent, that is, extending within the pressure vessel generally along its centerline and opening into the vessel in a direction parallel to or generally aligned with the longitudinal central axis of the vessel. In such arrangements it has been observed that inordinately high pulsation levels occur at frequencies which correspond to the length resonant frequency of the pressure vessel even though the location of the inlet and outlet conduits are as suggested by the above-referenced patents.

In accordance with the present invention it has been discovered that the generation and transmission of pressure pulsations at resonant frequencies may be amplified in an acoustical capacitance of the so-called bottle or pressure vessel type, for example, in those cases wherein the fluid conduits open into the vessel in a direction parallel to or generally aligned with the vessel longitudinal axis. This pulsation amplification or lack or suppression is believed to be due to excitation by velocity coupling or, in other words, amplification of the particle velocity of the fluid in the vessel due to the velocity of a fluid modulating inlet flow. In the cases where vessel resonant frequencies are not involved, one would expect, for example, that absolute particle velocities in the vessel would be less than those in the inlet conduit as a function of the ratio of the diameters of the conduit with respect to the vessel. However, it has been observed that when the frequency of the inlet flow corresponds generally to a length resonant frequency of the pressure vessel that the particle velocities in the vessel can be substantially amplified. Moreover, similar effects occur at the outlet conduit. If the outlet conduit is located at a point of maximum velocity or velocity antinode of an excited resonant frequency standing wave, and if the opening of the outlet conduit is arranged parallel to or generally aligned with the longitudinal axis of the vessel there will be a strong tendency for the flow oscillation in the vessel to modulate flow into the outlet conduit. If the outlet conduit is of a length so as to be resonant at the same frequency then substantial amplification of the modulating flow can occur. In this regard it should be noted that all resonant frequency pulsations of an open ended conduit have a particle velocity maximum or antinode at the open end of the conduit. If this conduit end is located at a point of maximum particle velocity of an acoustic pulsation in the vessel then substantial acoustic intensity can be transmitted out of the vessel in spite of the fact that the conduit junction with the vessel is at a pressure node of a resonant frequency pressure wave. In pursuing the present invention it has been determined that with introduction of flow into and out of an acoustic capacitance such as a so-called bottle or pressure vessel type structure in a specified direction the effects of velocity induced or amplified pressure pulsations can be minimized.

SUMMARY OF THE INVENTION

The present invention provides an improved method and apparatus for minimizing the generation and transmission of acoustic pulsations in fluid transmission systems wherein the propagation of pulsations due to standing pressure waves and the particle velocity variations formed thereby are both minimized.

In accordance with one aspect of the present invention there is provided an apparatus in the form of an acoustical capacitance or enlarged pressure vessel wherein an inlet conduit to the pressure vessel opens into the vessel at a pressure node of a standing pressure wave representing a length resonant frequency of the pressure vessel or an odd harmonic thereof and wherein the inlet flow is directed transverse to the fluid particle velocity of pulsations of the frequency to be attenuated. By retaining the location of the conduit end at a pressure node of the pressure wave of the frequency to be suppressed and by directing the particle velocity of incoming pulsations to be substantially transverse to the vessel, length resonant acoustical vibrations in the vessel at the frequency being treated are minimized.

In a similar manner, outlet conduits from the pressure vessel should also be disposed so that their ends are at a pressure node of the standing wave of the frequency being dealt with and whereby the direction of outlet flow into the conduit should be transverse to the longitudinal axis of the vessel and therefore to the particle velocity of any pulsations at the frequency being treated. In this way a radial inward and outward fluid flow direction is provided with respect to the vessel resonant frequency length and which will avoid any stagnation pressure increase or so-called pitot effect in the outlet conduit in response to velocity perturbations in the vessel. Concomitantly the location of the end of the outlet conduit at a pressure node will minimize the transmission of pressure pulsations at the frequency being treated.

In accordance with another aspect of the present invention there is provided an apparatus for minimizing the transmission of acoustic vibrations in a fluid transmission system comprising an elongated pressure vessel having a diameter substantially larger than that of inlet and outlet conduits in fluid flow communication with the pressure vessel and wherein the inlet conduit extends generally parallel to the longitudinal axis of the pressure vessel and is formed with one or more openings into the vessel which are transverse to the vessel longitudinal axis or, stated otherwise, the openings lie in a plane or surface parallel to or generally aligned with the vessel longitudinal axis.

In accordance with another aspect of the present invention there is provided an apparatus adapted for attenuating vibrations in a fluid transmission system comprising a pressure vessel wherein inlet and outlet conduits extend coaxially with the longitudinal central axis of the pressure vessel for some distance within the vessel or extend parallel to the longitudinal central axis of the pressure vessel and which are configured to have inlet and outlet openings, respectively, which provide for fluid particle velocities to be introduced to the vessel transverse to the longitudinal axis or radially so that particle velocities resulting from fluid flow or from vibrations of the fluid in the conduits will be substantially transverse to particle velocities caused by longitudinal vibrations within the pressure vessel.

The abovedescribed features and advantages of the present invention as well as other superior aspects thereof will be further appreciated by those skilled in the art by reading the detailed description which follows in conjunction with the drawing.

DESCRIPTION OF THE PREFERRED EMBODIMENTS

Figure 1:
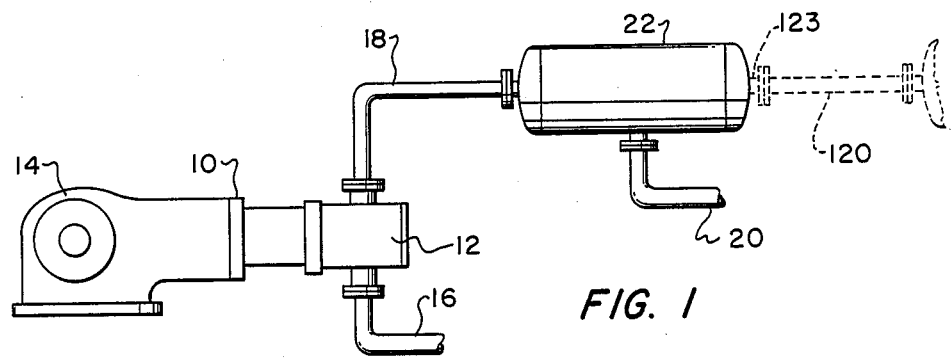
FIG. 1 is a schematic diagram of a gas compressor connected to an acoustic pulsation dampening apparatus in accordance with the present invention.

In the description which follows like parts are marked throughout the specification and drawing with the same reference numerals, respectively. The various figures of the drawing are not necessarily to scale and the scale may be exaggerated in certain instances in the interest of clarity.

Referring to FIG. 1, there is illustrated a portion of a fluid transmission system characterized, by way of example, as a positive displacement reciprocating piston type gas compressor, generally designated by the numeral 10. The compressor 10 is provided with a cylinder 12 and a power end or crankcase 14 including conventional mechanism, not shown, for reciprocating a piston, not shown, within the cylinder 12. The cylinder 12 includes a gaseous fluid inlet conduit 16 connected to a source of fluid such as a gas well or reservoir and a compressor discharge conduit 18 for discharging pressure gas into a transmission line, indicated generally by the numeral 20.

The inherent pulsating flow characteristics of the inlet and discharge fluid flow of a single or double acting positive displacement compressor of the general type illustrated can generate pressure pulsations which are transmitted through the fluid distribution system and which can be amplified and physically damaging to the fluid transmission lines as well as to flow measuring and metering equipment disposed throughout the transmission system. Accordingly, it is known to provide a pulsation dampening apparatus or acoustic filters in a fluid transmission system in order to minimize the generation and propagation or transmission of pressure pulsations and in order to minimize the shaking forces which may be imposed on the fluid transmission lines and the pulsation dampening apparatus.

In accordance with the present invention one form of pulsation dampening apparatus which is basically known but which has been modified in accordance with the improvement of the present invention comprises an elongated pressure vessel, generally designated by the numeral 22. The pressure vessel 22 is interposed in the transmission system between the lines 18 and 20 and may be configured generally in accordance with the teachings of U.S. Pat. No. 2,936,041 but is further configured in accordance with the teachings of the present invention. In a particular fluid transmission system a plurality of pressure vessels 22 or similar vessels may be arranged in series or series-parallel arrangements to dampen a range of pulsation frequencies which are likely to occur in the particular fluid transmission system in question. Although, as pointed out in the above-referenced patents, a pulsation dampening or acoustic filter system is typically designed to be non-resonant with the basic pulsation frequency of a pulsation source, such as the gas compressor 10, the compressor or other source may operate at various speeds and/or may be disposed in a system wherein a plurality of compressors or other pulsation sources are feeding into a common transmission line.

Accordingly, it is desirable to provide for the structure of a pulsation dampening apparatus such as the vessel 22 wherein the compressor discharge line or conduit 18 is connected to a conduit section 19 extending within the substantially closed interior chamber 30 of the pressure vessel and which conduit section has an outlet disposed essentially at the acoustic midlength of the vessel. The discharge conduit 20 is also connected to the pressure vessel 22 to open into the vessel interior chamber 30 at its acoustic midlength. Conventional flanged connections 21 are indicated in the drawing figures for interconnecting the conduit 18 with the conduit section 19 and for connecting the conduit 20 to a short conduit section 23. For the sake of discussion hereinafter the conduit 18-19 will be referred to as the inlet conduit and the conduit 20-21 as the outlet conduit with respect to the vessel 22. This conduit configuration will minimize the generation or transmission of the fundamental and odd harmonics of the vessel longitudinal or length resonant frequency which is desirably dampened and which would be normally amplified and propagated by the vessel 22 with only mild excitation. In this regard, the frequencies at which a bottle or pressure vessel such as the pressure vessel 22 is resonant to produce standing pressure waves therein are determined by the equation:

$$F_N = (NV/2L)$$

where $F_N$ is a resonant frequency, N is an integer, V is the velocity of sound in the fluid being transmitted through the transmission system in question and L is the effective acoustic length of the pressure vessel. Alternatively, the acoustic length L of the vessel is expressed as:

$$L = (NV/2F_N)$$

These relationships hold generally in those instances wherein (1) the pressure vessel diameter is relatively small compared with the wavelength of the pressure pulsations in the vessel (less than approximately 1/10 of the wavelength of the pulsations or vibrations in question) and (2) the bottle or vessel length is of the same order of magnitude or longer than one half the wavelength of the pressure wave in question.

Figure 2:
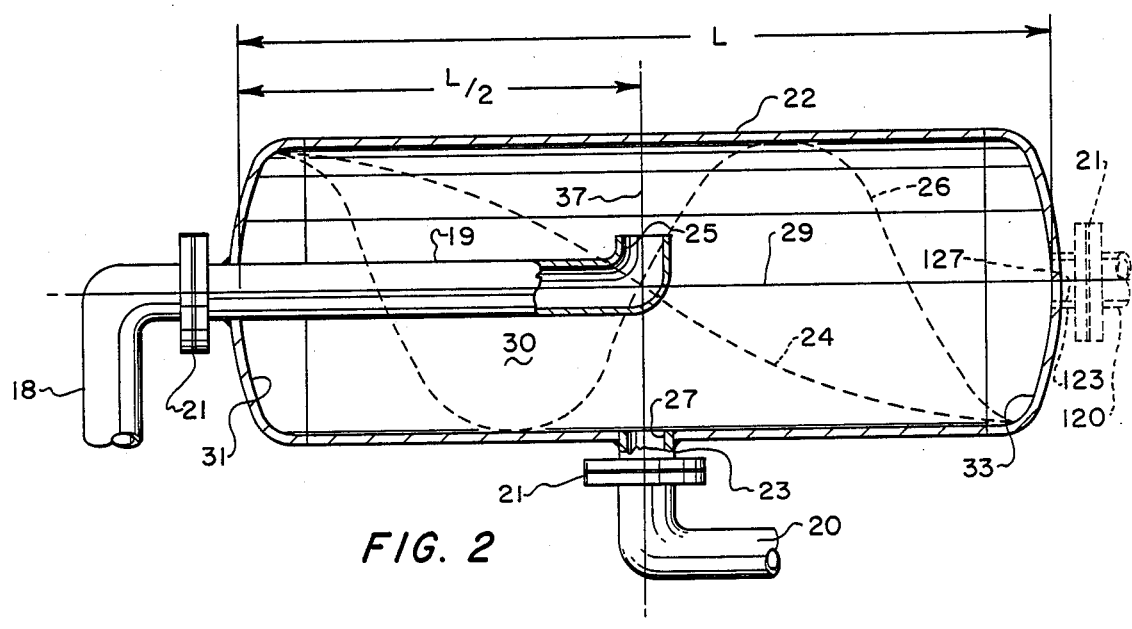
FIG. 2 is a longitudinal central section view of one embodiment of an elongated pressure vessel type pulsation dampening apparatus or acoustic filter in accordance with the present invention and illustrating the pressure standing wave pattern of the two lowest odd harmonics of length resonant frequencies of the vessel.

Accordingly, by placing the fluid inlet opening 25 of the conduit section 19 and the outlet opeining 27 of the conduit section 23 such that they open into the vessel at its acoustic midlength, as indicated in FIG. 2, the fundamental half wave resonant frequency indicated by the pressure wave 24 and odd harmonics thereof such as the third harmonic indicated by the pressure wave 26 in FIG. 2 will have a pressure node at the midpoint or center of the acoustic length of the vessel. The pressure waves 24 and 26 indicate the instantaneous static pressure in respective planes perpendicular to the vessel longitudinal central axis 29 at respective points along the axis. The pressure, for the sake of discussion, above the axis 29, viewing the drawing figures, may be assumed to be greater than the average static pressure in the vessel 22 while the pressure at points below axis 29 may be assumed to be less than the average static pressure in the vessel 22. Any standing pressure waves which may be present in the pressure vessel 22 of the fundamental length resonant frequency of the vessel or any odd harmonic thereof will not be transmitted into the conduits 18 or 20. Moreover, the establishment of standing pressure waves having odd values of N or odd modes of oscillation is suppressed by the arrangement of the conduit sections 19 and 23 as illustrated in FIG. 2. As a result of this arrangement, only those standing pressure waves of even values of N can exist in the vessel 22 at any appreciable amplitude. However, the forces derived from standing pressure waves having even values of N especially those forces acting on the vessel endwalls 31 and 33, are substantially in phase and balanced and do not contribute to shaking forces on the transmission system components including the vessel 22.

On the other hand, it may be desirable to minimize the transmission of even harmonics of a particular frequency, such as the vessel length resonant frequency, in which case it may be desirable to locate the openings of one or both of the conduit sections 19 or 23 at a pressure node of a standing pressure wave of an even harmonic, or locate one conduit at a pressure node of an even harmonic and the other conduit at a pressure node of the odd harmonics such as at the midlength of the pressure vessel. For the sake of description herein the acoustic length of the vessel 22 is meant ot comprise the actual length of the vessel interior chamber or a similar structure. For certain other vessels the acoustic length may be assumed to be the actual chamber length plus a length to correct for the effect of the configuration of the ends of the vessel or conduit.

Figure 3:
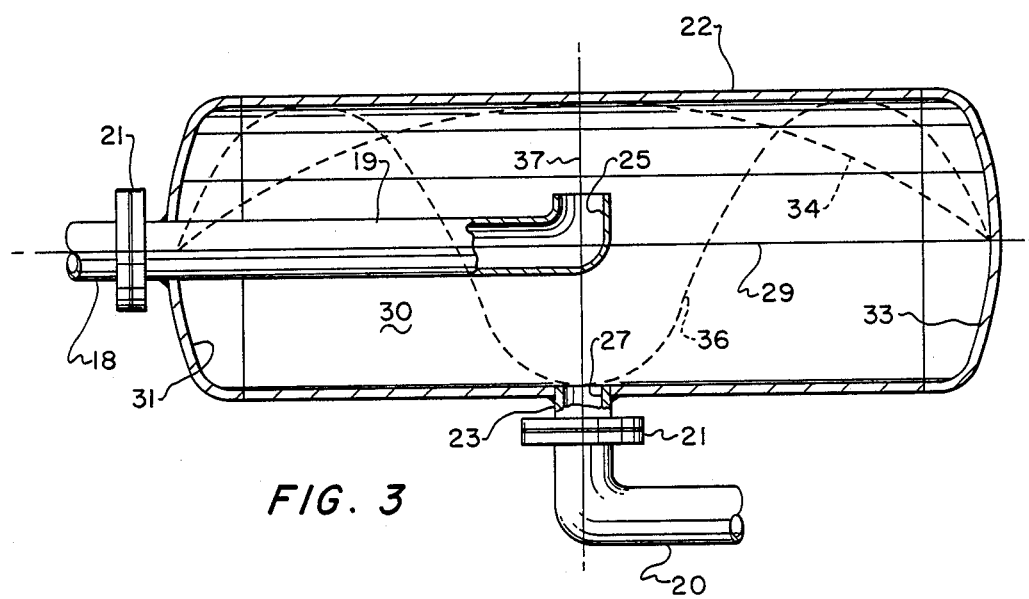
FIG. 3 is a section view similar to FIG. 2 illustrating the particle velocity wave or variation of the vessel fundamental resonant frequency and the third harmonic frequency superimposed on the vessel length.

Referring now to FIG. 3 also, it has been determined in accordance with the present invention that even though acoustic filter networks in accordance with the teaching of U.S. Pat. Nos. 2,936,041 and 2,997,124 are employed in a particular fluid transmission system that certain frequencies for which a filter was purposely designed to suppress continued to exist at unwanted pressure pulsation or vibration intensities. It has been discovered that if the inlet and outlet conduits connected to an acoustic capacitance such as the pressure vessel 22, provide for flow through the conduit openings into the vessel in a direction generally parallel to the longitudinal axis of the vessel, such as the axis 29, that there is actually an amplification and propagation of pulsation frequencies which the vessel is designed to suppress. For example, the configuration of the inlet conduit or conduits for an elongated pressure vessel which extend generally along the central axis of the vessel and have an outlet opening disposed in a plane substantially perpendicular to the longitudinal axis at the midlength of the vessel exposes said opening or openings to instantaneous fluid particle velocities in the vessel which are at a maximum for those pulsation frequencies having standing pressure waves wherein the pressure nodes occur at the acoustic midlength. FIG. 3, for example, shows the velocity variation or velocity wave profile of fluid particles which are responding to pulsations of the frequency of the pressure wave 24. This variation is indicated by the curve or velocity wave 34 in FIG. 3. In like manner, the fluid particle velocity variation along the length of the pressure vessel 22 for the pressure wave 26 is indicated by the curve or wave profile 36 in FIG. 3. The curves 34 and 36 have been superimposed on the longitudinal cross-sectional view of the pressure vessel 22 to indicate the instantaneous particle velocity magnitude at respective longitudinal positions along the length axis 29 of the pressure vessel. The actual particle velocities are in an axial direction or parallel to the axis 29. The actual velocity of fluid particles is to the right for points on the velocity waves 34 and 36 above the axis 29, viewing the drawing figures, and to the left for points on the velocity waves below the axis 29. In any case particle velocities are at a maximum where pressure or density oscillations are at a minimum. Actual particle velocity oscillations near the opposite ends 31 and 33 of the vessel 22 are very near zero, as indicated by the curves 34 and 36, but are at a maximum at the centerpoint or vessel midlength. Accordingly, the location of the flow junction of the inlet and outlet conduit sections 19 and 23 with the pressure vessel 22 which is appropriate for minimizing the transmission of pressure pulsations as a result of pressure variations in the fluid in the pressure vessel, expose these conduits to the maximum particle velocity or kinetic energy condition of the fluid in the pressure vessel or resulting from pressure pulsations being transmitted at the same frequency into or out of the pressure vessel through the conduits 18 and 20. This so-called kinetic energy or velocity coupling can result in the transmission or amplification of pressure pulsations of the same frequency which is to be suppressed.

However, resonant pulsation response of the fluid transmission system including the conduit sections 19 and 23 and the pressure vessel 22 can be minimized by redirecting the outlet flow to and from the condits 18 and 20 generally radially with respect to the longitudinal axis 29 of the pressure vessel and substantially transverse to the velocity of the particles of any standing pressure waves in the pressure vessel, such as the pressure waves 24 and 26. Moreover, not only is the pulsation flow entering the vessel 22 in a direction perpendicular to the instantaneous velocity of the particles of the same pressure pulsation frequency but the inlet and outlet conduits may be configured to direct the pulsations away from each other as indicated by the arrangement of the openings 25 and 27 in the inlet and outlet conduit sections 19 and 23, respectively. In this regard, it is believed by application of the principles of conservation of mechanical energy through conversion of fluid velocity to pressure that such transmission of energy can be avoided by directing the inlet and outlet openings of respective flow conduits such as the conduit sections 19 and 23 substantially radially with respect to the longitudinal axis 29 of an acoustic capacitance such as the pressure vessel 22. Accordingly, the pressure vessel 22, as shown in FIGS. 2 and 3, has the opening 25 of conduit section 19 which lies in a plane parallel to the axis 29 and substantially perpendicular to the central transverse plane, indicated by line 37 of the pressure vessel 22. In a similar arrangement the opening 27 formed by the conduit section 23 in the sidewall of the pressure vessel 22 also lies in a plane perpendicular to the central transverse plane 37. In this way any coupling of the velocity effect of the pressure waves 24 or 26 or any other odd harmonics of the frequency represented by the pressure wave 24 will not be amplified or transmitted as a result of any fluid particle kinetic energy coupling effect.

Referring further to FIGS. 1 and 2, there is illustrated an alternate location for an outlet conduit from the pressure vessel 22, which outlet conduit is indicated by the numeral 120 and is coupled to a short conduit section 123 opening through the vessel endwall 33 at 127. The conduit 120-123 is preferably formed with a suitable flanged connection such as the connection 21. By arranging the outlet conduit at the alternate location indicated by the conduit 120 along the vessel central axis and at one end of the vessel and by making the conduit with an acoustic resonant frequency equal to the acoustic resonant frequency of the pressure vessel 22, pulsations which create shaking forces in the vessel 22 are minimized. This means of reducing shaking forces in vessel 22 will generally result in larger pulsation levels transmitted through the conduit 120 to downstream piping.

Figure 4:
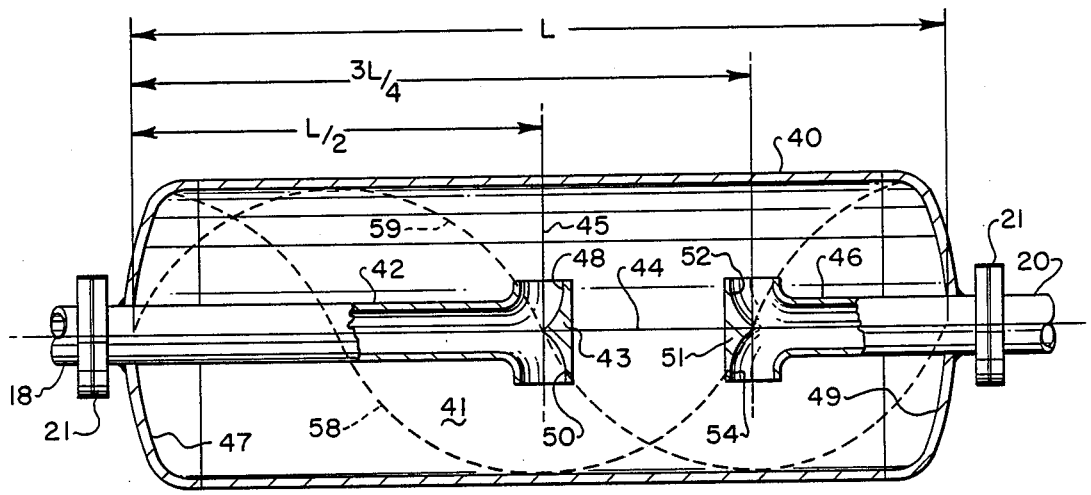
FIG. 4 is a longitudinal central section view of an alternate embodiment of the pulsation dampening apparatus of the present invention.

Referring now to FIG. 4, there is illustrated an alternate embodiment of the present invention comprising an acoustical capacitance in the form of a pressure vessel 40 substantially the same as the vessel 22 but having an inlet conduit section 42 extending along the central longitudinal axis 44 of the vessel and an outlet conduit section 46 also extending along the central longitudinal axis. The conduit section 42 extends through an endwall 47 and coaxially with the axis 44 into the vessel interior chamber 41 to the acoustic length center or midpoint of the vessel 40. The conduit section 42 is provided with a transverse endwall 43 and opposed outlet openings 48 and 50 which are directed radially outwardly with respect to the axis 44 and lie in planes parallel to the axis 44. In a similar manner the conduit section 46 extends along the axis 44 through endwall 49 and has a transverse endwall 51. The conduit section 46 is formed to have opposed openings 52 and 54 which also lie in planes parallel to the axis 44 and open in a radial direction with respect to said axis. The openings 52 and 54 are disposed at a pressure node of even harmonics of the length resonant frequency of the vessel 40 and are located at the one quarter (or three quarter point, as indicated) of the acoustic length L of the vessel 40. Accordingly, pressure pulsations of the second harmonic of the vessel length resonant frequency, represented by the pressure wave 58 in FIG. 4, will not be transmitted from the vessel 40 through the conduit 46 nor will harmonics of the sixth and the tenth order, and so on. Moreover, by placing the openings 52 and 54 in planes or surfaces parallel to the axis 44 the instantaneous fluid particle velocities of pressure waves in the vessel chamber 41 and of the second, sixth and tenth harmonics of the vessel length resonant frequency will be transverse to the particle velocity of fluid entering the vessel chamber 41 through these openings. The fluid particle profile curve or wave, indicated by numeral 59, denotes the magnitude of the instantaneous particle velocities of the pressure wave 58 and at points along axis 44. Of course, by locating the openings 48 and 50 of the conduit 42 at the midlength of the acoustic length L of the vessel 40 excitation or transmission of the fundamental length resonant frequency of the vessel 40 or odd harmonics thereof are minimized. Velocity coupling of pressure waves at the fundamental length resonant frequency, odd harmonics, and the important second, even harmonic is therefore minimized thanks to the radial introduction of any pulsating flow into or out of the conduit sections 42 and 46.

The configurations of the pressure vessels 22 and 40 and their respective inlet and outlet conduit sections are exemplary in the sense that, in a particular fluid transmission system including a filter network, several acoustic capacitances such as the pressure vessels 22 or 40 may be employed with conduits interconnecting these capacitances and which open into the vessels at pressure nodes of the pressure waves of various harmonics of the frequency to be attenuated. Moreover, in many fluid transmission systems there are other design constraints on the pressure vessels and piping making up the filter network or the components which comprise the acoustic filters or which are designed to minimize excitation at their fundamental resonant frequency or any multiples thereof since such vessels and piping may also serve as other devices in a fluid transmission system such as performing a process function, for example.

Figure 5:
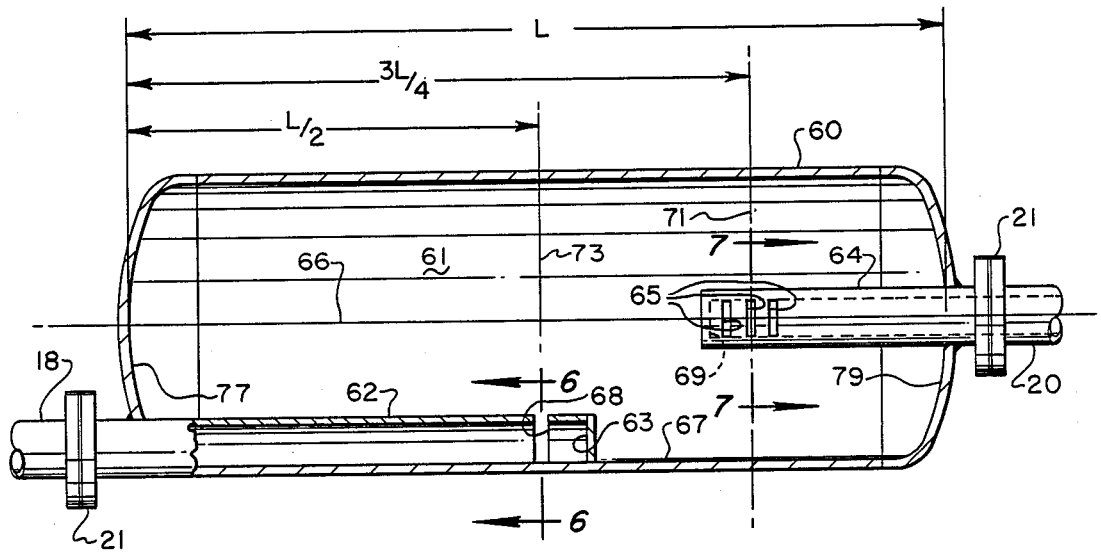
FIG. 5 is a longitudinal central section view of a second alternate embodiment of a pulsation dampening apparatus in accordance with the present invention.
Figure 6:
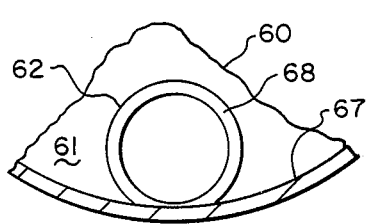
FIG. 6 is a detail section view taken along the line 6—6 of FIG. 5.
Figure 7:
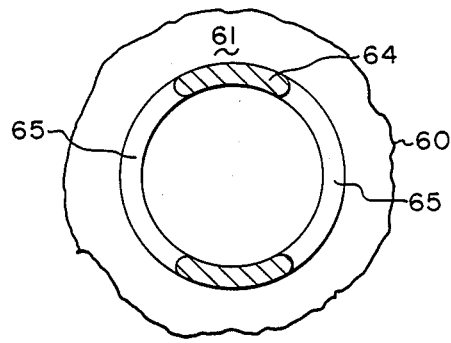
FIG. 7 is a detail section view taken along the line 7—7 of FIG. 5.

Referring now to FIGS. 5 through 7, there is illustrated a second alternate embodiment of a pressure vessel, generally designated by the numeral 60, defining an enclosed chamber 61 and having an inlet conduit section 62 and an outlet conduit section 64 for conducting fluid flow to and from the vessel 60. The inlet conduit 62 extends through a vessel endwall 77 and parallel to the central longitudinal axis 66 of the vessel 60. However, the conduit section 62 is offset laterally from axis 66, extends along a cylindrical sidewall 67 of the vessel and is provided with a peripheral slotlike opening 68 which directs flow in a substantially radial direction with respect to the longitudinal axis 66 at the midlength of the acoustic length L of the vessel 60. The conduit section 62 is closed at its distal end by a transverse endwall 63. The conduit section 62 and the configuration of the opening 68 avoids exciting or transmitting fluid pressure pulsations of the fundamental length resonant frequency of the vessel 60 or any odd harmonics thereof and avoids any kinetic energy coupling effect of pressure pulsations entering the vessel 60 from the conduit 62 or exiting from the vessel 60 to the conduit 62 as a result of fluid particle velocities of the fluid in the vessel 60 or the conduit 62 of pressure pulsations to be suppressed.

As with the embodiment illustrated in FIG. 4, the vessel 60 has its outlet conduit section 64 extending through the endwall 79 and along the vessel central longitudinal axis 66. The arrangement of the conduit sections 64 also prevents transmission of the second, sixth, tenth, fourteenth, etc., even harmonics of the vessel length resonant frequency between the vessel 60 and the conduit section 64 by arranging the fluid flow openings into the conduit section 64 at the three quarter (one quarter) point of the acoustic length L of the vessel 60. The openings of the conduit section 64 are characterized as peripheral slots 65 which direct pulsating fluid flow generally radially outward with respect to the axis 66 to minimize the kinetic energy coupling effect of pressure pulsations present in the vessel 60 or the conduit 64 at the even harmonics of the length resonant frequency of the vessel 60. The conduit section 64 is closed at one end by a transverse wall 69. Moreover, in accordance with the present invention a plurality of relatively thin radially extending slots 65 are provided so that the openings of the conduit section 64 into the interior of the vessel 60 are as close to the transverse plane 71 at the three quarter acoustic length point of the length L of the vessel as possible. This arrangement of slots 65 thereby minimizes pressure pulsation transmission between the vessel 60 and the conduit section 64 which would occur as a result of a portion of the openings between the conduit and the vessel being out of the exact plane of the pressure node of the second, sixth, tenth, etc., harmonics of the vessel length resonant frequency.

In a similar manner the opening 68 is configured as a relatively thin peripheral slot in the conduit section 62 which is arranged substantially centered about a transverse plane 73 at the midlength of the acoustic length L of the vessel 60 and perpendicular to the axis 66 to minimize the transmission or excitation of pressure pulsations as a result of a portion of the opening not being exactly at the pressure wave node. Of course, as a practical matter the exact configuration of the openings 65 and 68 may be subject to other considerations such as minimizing flow throttling losses and mechanical design constraints.

Accordingly, the present invention contemplates that resonant pulsation response of a fluid transmission system can be minimized by redirecting outlet flow from conduits such as acoustic inductances or chokes to and from an acoustic capacitance such as a pressure vessel or "bottle" by retaining the location of the conduit end or opening at a pressure node of a frequency whose pulsations are to be suppressed or eliminated and by directing fluid particle velocity of the pulsations of such frequencies substantially transverse to the pressure vessel acoustic length wherein both pressure and velocity sources of pulsation excitation are minimized.

Those skilled in that art will recognize that various other configurations in addition to those described in detail herein can be used so long as the fluid flow to and from the pressure vessel or acoustic capcitance is directed to be transverse to the fluid particle velocity of any pulsations in the pressure vessel at the frequency to be suppressed. In the description herein the terms inlet and outlet refer to the acoustic pulsation propagation direction. The actual convection flow of the fluid through the system can be in either direction without effecting the function of the apparatus described.

Although preferred embodiments of the present invention have been described herein those skilled in the art will recognize that various substitutions and modifications may be made to the embodiments described without departing from the scope and spirit of the invention recited in the appended claims.

What we claim is:

1. Apparatus for minimizing the transmission of acoustic pulsations in a fluid transmission system comprising:
   means forming an elongated pressure vessel closed at opposite ends by opposed endwalls and forming an enclosed chamber having an acoustic length;
   a first fluid conduit having means forming an opening into said chamber;
   a second fluid conduit having means forming an opening into said chamber whereby fluid may be transmitted between said conduits through said pressure vessel; and
   said means forming said openings of said conduits each, respectively, are disposed in said pressure vessel at substantially the maximum amplitude of a fluid particle velocity wave corresponding to a standing pressure wave of a selected resonant frequency of which said pulsations are to be minimized and said means forming said openings in said first and second conduits are each disposed so as to cause fluid flow in a direction substantially transverse to the fluid particle velocity to minimize coupling of kinetic energy between fluid in said pressure vessel and said conduits, respectively.

2. The apparatus set forth in claim 1 wherein:
said means forming said opening in said first conduit is disposed in said pressure vessel at the midpoint of the acoustic length of said pressure vessel.

3. The apparatus set forth in claim 2 wherein:
said means forming said opening in said first conduit lies in a plane substantially parallel to the longitudinal axis of said pressure vessel.

4. The apparatus set forth in claim 2 wherein:
said means forming said opening in said first conduit is formed to direct fluid flow from said opening in said first conduit in a radial direction with respect to a longitudinal central axis of said pressure vessel.

5. The apparatus set forth in claim 2 wherein:
said first conduit extends through one of said endwalls and to said point substantially midway between said endwalls.

6. The apparatus set forth in claim 5 wherein:
said second conduit extends through the other of said endwalls and opens into said pressure vessel at a pressure node of a standing pressure wave of a pulsation frequency to be suppressed.

7. The apparatus set forth in claim 1 wherein:
said first conduit includes means forming an end cap to deflect flow through said opening in said first conduit in a direction transverse to the direction of fluid particle velocity of a standing pressure wave of the resonant frequency to be suppressed.

8. The apparatus set forth in claim 2 wherein:
said means forming said opening in said second conduit is disposed in said pressure vessel at a point substantially midway between said endwalls.

9. The apparatus set forth in claim 2 wherein:
said means forming said opening in said second conduit is disposed in said pressure vessel at a pressure node of a second harmonic of a fundamental acoustic length resonant frequency of said pressure vessel.

10. The apparatus set forth in claim 2 wherein:
said means forming said openings in first and second conduits are disposed in said pressure vessel so as to direct fluid particle velocity in the same direction at the midpoint of the acoustic length of said pressure vessel and in a direction substantially radial with respect to the longitudinal axis of said pressure vessel.

11. An apparatus for suppressing pressure pulsations in a fluid transmission system generated by a fluid pumping device, comprising:
   a component of said fluid transmission system through which convective fluid flow is transmitted including an elongated pressure vessel having a fluid inlet conduit and a fluid outlet conduit opening into an interior chamber of said pressure vessel, said pressure vessel having an acoustic length measured parallel to an axis of said pressure vessel, at least one of said conduits opening into said chamber at a point corresponding to the maximum amplitude of a fluid particle velocity wave in said chamber corresponding to a standing pressure wave of a resonant frequency of said pressure vessel, aid one conduit having means forming an opening configured such that a fluid flow at said opening is in a direction transverse to the fluid particle velocity wave at said resonant frequency of said pressure vessel.

12. The apparatus set forth in claim 11 wherein:
said one conduit opens into said chamber at a midpoint of said acoustic length and so as to direct said fluid particle velocity at said opening radially with respect to said axis.

13. The apparatus set forth in claim 12 wherein:
the other of said conduits includes means forming an opening into said chamber at a quarter point of said acoustic length and so as to direct fluid particle flow at said opening of said other conduit transverse to the fluid particle velocity wave at an even harmonic of said resonant frequency.

14. The apparatus set forth in claim 12 wherein:
both of said conduits open into said chamber at said midpoint and said openings are configured so as to direct fluid flow perpendicular to said axis.

15. The apparatus set forth in claim 11 wherein:
said other conduit opens into said chamber at one end of said pressure vessel and has an acoustic length resonant frequency equal to the length resonant frequency of said pressure vessel.

16. The apparatus set forth in claim 15 wherein:

said other conduit opens into said chamber along a central axis of said pressure vessel.

17. Apparatus for minimizing the transmission of acoustic pulsations in a fluid transmission system, comprising:

means forming an elongated pressure vessel having opposed endwalls and forming an enclosed chamber having an acoustic length;

a first fluid conduit extending into said chamber and having means forming an opening to said chamber at a predetermined point of the acoustic length of said pressure vessel and at the point of substantially maximum amplitude of a fluid particle velocity wave corresponding to a standing pressure wave in said chamber of an acoustic length resonant frequency of said pressure vessel, said means forming said opening in said first conduit being disposed such that fluid flow into and out of said first conduit are in a direction transverse to the direction of the fluid particle velocity at said length resonant frequency; and said means forming said opening in said second conduit is disposed at one endwall of said pressure vessel and said second conduit has a length resonant frequency equal to said length resonant frequency of said pressure vessel.

18. A method for constructing an enlarged pressure vessel for minimizing the transmission of fluid pressure pulsations in a fluid transmission system, said enlarged pressure vessel having an acoustic length and including an inlet conduit for a first opening into a chamber and an outlet conduit for a second opening into said chamber whereby said conduits are operable to conduct fluid into and out of said chamber, said method comprising the steps of:

determining the acoustic length of said pressure vessel;

determining a fundamental resonant frequency and harmonics of said fundamental frequency of said pressure vessel;

locating said openings of said conduits at a point corresponding to the maximum amplitude of a fluid particle velocity wave corresponding to a standing pressure wave of a resonant frequency of said pressure vessel and directed such that fluid flow at said openings are in a direction transverse to the fluid particle velocity at said resonant frequency of said pressure vessel.

19. The method set forth in claim 18 including the step of:

locating said means forming said opening of one of said conduits at the pressure node of a standing pressure wave of a fundamental resonant frequency and odd harmonics of said fundamental resonant frequency.

20. The method set forth in claim 19 including the step of:

locating said means forming said opening in the other of said conduits at a pressure node of an even harmonic of said fundamental resonant frequency.

21. A method for constructing an apparatus for minimizing the transmission of fluid pressure pulsations in a fluid transmission system at a junction between fluid conducting components of said transmission system said apparatus including an opening for one of said components into a chamber formed by the other component whereby said components are operable to conduct fluid into and out of said chamber said method comprising the steps of:

determining an acoustic length of at least one of said components;

determining a fundamental resonant frequency and harmonics of said fundamental frequency of said one component;

locating said opening at a point corresponding to the maximum amplitude of a fluid particle velocity wave corresponding to a standing pressure wave of a resonant frequency of said one component and directed such that fluid flow at said opening are in a direction transverse to the fluid particle velocity at said resonant frequency of said one component.

* * * * *